(No Model.)

W. C. & J. T. VAN DILLEN.
HANDLE FOR BRAKE STAFFS.

No. 551,418. Patented Dec. 17, 1895.

Witnesses
Lee Sale
Alfred A. Mathey

Inventors
William C. Van Dillen
John T. Van Dillen
By their Attorneys
Kellett & Starek

UNITED STATES PATENT OFFICE.

WILLIAM C. VAN DILLEN AND JOHN T. VAN DILLEN, OF ST. LOUIS, MISSOURI.

HANDLE FOR BRAKE-STAFFS.

SPECIFICATION forming part of Letters Patent No. 551,418, dated December 17, 1895.

Application filed September 11, 1895. Serial No. 562,142. (No model.)

*To all whom it may concern:*

Be it known that we, WILLIAM C. VAN DILLEN and JOHN T. VAN DILLEN, citizens of the United States, residing at St. Louis, in the State of Missouri, have invented certain new and useful Improvements in Handles for Brake-Staffs, of which the following is a full, clear, and exact description, reference being had to the accompanying drawings, forming a part hereof.

Our invention has relation to improvements in handles for brake-staffs; and it consists in the novel arrangement and combination of parts more fully set forth in the specification and pointed out in the claims.

Figure 1:
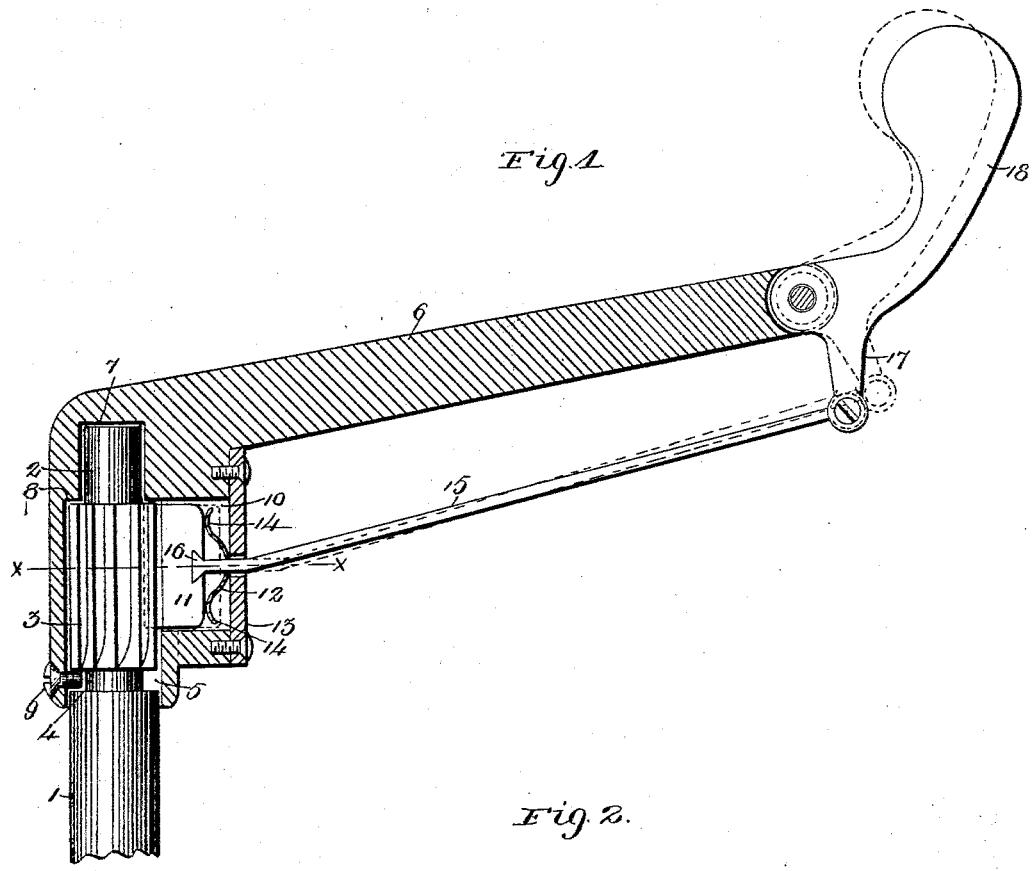
Figure 2:
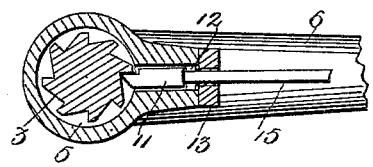

In the drawings, Figure 1 is an elevation of the top of the brake-staff, showing the handle portion in longitudinal section mounted on the same; and Fig. 2 is a transverse section on line $x\ x$ of Fig. 1, showing the pawl in top plan.

The object of our invention is to construct a handle for brake-staffs (in connection with what are known as "ratchet-brakes") which, upon release of the brake-shoes from the wheels of the car, will allow the brake-staff to rotate back to its normal position without carrying the handle bodily with it, as now generally happens with brakes of the type referred to, a construction which is objectionable, making the handle liable in its rotation to forcibly strike the brakeman about the chest, and thus forming a source of constant inconvenience. To overcome these objections we have devised a handle which in detail may be described as follows:

Referring to the drawings, 1 represents the brake-staff, the upper reduced extension 2 of which has secured thereto the ratchet 3, the latter being located a slight distance above the shoulder 4 formed at the junction of the reduced extension with the staff proper. The socket 5 of the base of the handle 6 has a suitable cavity 7 formed at the upper portion thereof for the reception of the upper portion of the reduced extension 2, a shoulder 8 being formed at the juncture of the socket and cavity, which shoulder rests on top of the ratchet 3. The handle is kept in position on the staff by a screw 9 passed through the lower portion of the wall of the socket and into the space formed between the lower face of the ratchet and the shoulder 4. Forming a lateral continuation of the socket 5 is a chamber 10 of suitable proportions to receive and permit the operation of the pawl 11 extending approximately the full height of the chamber, and co-operating with the teeth of the ratchet. Interposed between the inner wall of the chamber and the adjacent lateral surface of the pawl is an outwardly-convexed plate or spring 12, the base of the convex portion resting against the inner surface of the cover-plate 13 forming one of the walls of the chamber. The free curved ends or arms 14 of the spring-plate 12 keep the pawl normally in engagement with the teeth of the ratchet. The pawl is connected to a connecting-rod 15 by a dovetail socket and corresponding head 16 formed at the inner end of the rod, the latter passing through suitable openings formed in the cover-plate 13 and spring-plate 12 to effect the connection. The outer end of the rod (which is normally parallel to the axis of the handle 6, with the exception of the portion confined within the chamber 10, which is parallel to the general movement of the pawl) is pivotally connected to the lower projecting lug 17 of the knob or movable terminal portion 18 of the handle, pivotally secured to the free end of the latter.

From the connections described it is apparent that after the brake-staff has been turned to put on the brakes that the pawl can be disengaged from the ratchet portion thereof by simply tilting the knob, as indicated in dotted lines in Fig. 1, whereby the connecting-rod will disengage the pawl against the resiliency of the spring-plate 12, and allowing the brake-staff to assume and rotate back to its normal position without carrying with it the handle. Thus the objection above referred to is completely overcome.

Having described our invention, what we claim is—

1. In a brake staff handle, a handle portion proper, a socket formed at one end of the same for the reception of the brake staff, a lateral extension or chamber communicating with said socket, a pawl mounted in said chamber, suitable means for keeping said pawl in engagement with the brake staff, a pivoted knob carried at the free end of the handle, a lug depending from the knob in proximity to the pivotal point of the latter and forming an integral part of said knob, a connecting rod pivotally secured at one end to the lug and having its opposite end secured to the pawl whereby the latter may be disengaged from the brake staff by the tilting of the knob, substantially as set forth.

2. A brake-staff handle comprising a handle portion proper, a socket formed at one end of the same for the reception of the brake-staff, a lateral extension or chamber communicating with said socket, a pawl mounted in said chamber, a convex spring plate interposed between pawl and the side wall of the socket, the convex portion of the spring resting against the wall, a pivoted knob carried by the free end of the handle, a lug depending from the knob in proximity to the pivotal point of the latter, a connecting rod pivotally secured at one end to the lug and being substantially parallel to the general axis of the handle, and having an inner extension substantially parallel to the movement of the pawl and connected to the latter and passing through suitable openings formed in the convex portion of the spring plate and in the wall on which said convex portion rests, substantially as set forth.

In testimony whereof we affix our signatures in presence of two witnesses.

WILLIAM C. VAN DILLEN.
JOHN T. VAN DILLEN.

Witnesses:
LEE SALE,
E. STAREK.